United States Patent
Bülow

(10) Patent No.: US 7,546,040 B2
(45) Date of Patent: Jun. 9, 2009

(54) FIBER OPTICAL SYSTEM FOR PMD MITIGATION BY POLARIZATION SCRAMBLING

(75) Inventor: Henning Bülow, Kornwestheim (DE)

(73) Assignee: ALCATEL, Paris (FR)

( * ) Notice: Subject to any disclaimer, the term of this patent is extended or adjusted under 35 U.S.C. 154(b) by 389 days.

(21) Appl. No.: 11/298,499

(22) Filed: Dec. 12, 2005

(65) Prior Publication Data
US 2006/0153574 A1 Jul. 13, 2006

(30) Foreign Application Priority Data
Jan. 12, 2005 (EP) .................................. 05290078

(51) Int. Cl.
*H04B 10/00* (2006.01)
(52) U.S. Cl. .................... 398/152; 398/154; 398/184; 398/155; 398/81
(58) Field of Classification Search ................ 398/152, 398/155, 154, 81, 184, 88; 359/499, 501
See application file for complete search history.

(56) References Cited

U.S. PATENT DOCUMENTS

| 6,538,786 | B1 * | 3/2003 | Naito ........................ 398/152 |
| 6,618,513 | B2 * | 9/2003 | Evankow, Jr. ................. 385/11 |
| 6,657,709 | B2 * | 12/2003 | Koh et al. .................. 356/73.1 |
| 6,765,723 | B1 * | 7/2004 | Savory ....................... 359/499 |
| 6,959,152 | B2 * | 10/2005 | Fujiwara et al. ............... 398/81 |
| 7,095,912 | B1 * | 8/2006 | Frigo et al. .................... 385/11 |
| 7,206,517 | B1 * | 4/2007 | Yu et al. ..................... 398/152 |
| 2002/0060822 | A1 | 5/2002 | Wedding |
| 2003/0039427 | A1 * | 2/2003 | Yamaguchi .................. 385/11 |
| 2003/0095734 | A1 | 5/2003 | Nakajima et al. |
| 2004/0151509 | A1 * | 8/2004 | Bulow ....................... 398/147 |
| 2004/0202396 | A1 * | 10/2004 | Chung et al. .................. 385/1 |
| 2005/0088726 | A1 * | 4/2005 | Yamaguchi .................. 359/337 |

OTHER PUBLICATIONS

Liu, X.: "Experimental Demonstration of Broadband PMD Mitigation through Distributed Fast polarization Scrambling and FEC" European Conference on Optical Communication, Sep. 2004, XP002328662, Stockholm, Sweden.
Yan L-S et al.: "Simple bit-rate-independent PDM monitoring for WDM systems" Optical Communication, 2001. ECOC '01. 27th European Conference on Sep. 30-Oct. 4, 2001, Piscataway, NJ, USA, IEEE, vol. 2, Sep. 30, 2001, pp. 206-207, XP010582632.
L. Moeller, et al.: "Novel RZ Receivers with Enhanced Jitter and PMD Tolerance" OFC 2002 Postdeadline Papers, FD7-1-FD7-3.

\* cited by examiner

*Primary Examiner*—Ken N Vanderpuye
*Assistant Examiner*—Hibret A Woldekidan
(74) *Attorney, Agent, or Firm*—Sughrue Mion, PLLC

(57) ABSTRACT

A fiber optical system (10) for transmitting an optical signal comprises an optical fiber line (1) with a plurality of successively arranged polarization scramblers (6a to 6c) for polarization modulation of the optical signal transmitted through the optical fiber line (1) and a reference frequency signal (11) which synchronizes scrambling frequencies of all of the polarization scramblers (6a to 6c) to a common reference frequency.

12 Claims, 1 Drawing Sheet

FIBER OPTICAL SYSTEM FOR PMD MITIGATION BY POLARIZATION SCRAMBLING

The invention is based on a priority application EP 05290078.4 which is hereby incorporated by reference.

FIELD OF THE INVENTION

The invention relates to a fiber optical system for transmitting an optical signal, comprising an optical fiber line with a plurality of successively arranged polarization scramblers for polarization modulation of the optical signal transmitted through the optical fiber line.

BACKGROUND OF THE INVENTION

Polarization mode dispersion (PMD) is one of the major obstacles in high-speed long-haul transmissions with bit-rates of about 10 to 40 Gb/s. In order to mitigate PMD, distributed polarization scrambling in conjunction with forward error correction (FEC) has been proposed in the paper "Experimental Demonstration of Broadband PMD Mitigation through Distributed Fast Polarization Scrambling and FEC" by X. Liu et al. in an ECOC 2004 post-deadline session.

The principle of this proposed method of PMD mitigation is shown in FIG. 2. An optical fiber line 1 for transmission of optical signals at a high bit-rate is arranged between an optical transmitter 2 and an optical receiver 3. At the transmitter end of the optical fiber line 1, a multiplexer 4 is arranged which performs wavelength division multiplexing (WDM) to optical signals with different wavelengths entering the multiplexer, forming a wavelength multiplexed signal which is transmitted through the optical fiber line 1 and demultiplexed in a demultiplexer 5 at the receiver end of the optical fiber line 1.

A plurality of fast polarization scramblers, of which three (6a to 6c) are represented in FIG. 2, are distributed successively along the fiber line 1. Each of the polarization scramblers 6a to 6c is followed by a successive fiber link 7a to 7c. The purpose of the polarization scramblers 6a to 6c is to provide scrambling signals which generate a periodic polarization change such that bit errors, which are generated by the interference of adjacent bit pulses of the optical signal transmitted through the fiber line 1, can be effectively reduced by error correction means in the receiver. (Commonly this means that the strong error periods are sufficiently short so that the FEC is capable to correct the errors.) The polarization scramblers 6a to 6c work at polarization modulation rates of some 10 MHz. A forward error correction decoder 8 is arranged in succession to the receiver 3 for decoding redundant bits being present in the optical signal in addition to information bits and compensating for transmission errors of the information bits by using the redundant bits.

In the presence of fiber PMD the distortion of the bit pulses (jitter, eye opening) changes quickly with the period of the scrambling rate. This means that for optimum PMD mitigation the receiver decision threshold (i.e. decision time and phase) has to follow the cyclic moving distortion. Hence the receiver 3 must be a so-called "scrambling receiver" which adapts to the eye changing with the scrambling rate.

OBJECT OF THE INVENTION

It is the object of the invention to provide a fiber optical system which is capable of mitigating PMD by polarization scrambling.

SHORT DESCRIPTION OF THE INVENTION

This object is achieved by a reference frequency signal which synchronizes scrambling frequencies of all of the polarization scramblers to a common reference frequency.

The adaptation of the receiver to the eye change will be strongly complicated or will be even impossible if the distributed polarization scramblers have different scrambling rates (scrambling frequencies). Then the eye distortion will not only be cyclic with the scrambling rate, which is already compensated by the "scrambling receiver", but the distortions will also change with the beat frequencies of the scramblers. By performing a synchronization of the scrambling rate of the different distributed scramblers to a common reference frequency, such that the different scramblers have a sufficiently narrow or even vanishing difference of the scrambling rates, the "scrambling receiver" is able to adjust to the cyclic changing eye and thus the maximum PMD mitigation will be achieved. Different means for generating the reference frequency signal are proposed below.

In a preferred embodiment, the optical fiber line is disposed between an optical transmitter and an optical receiver and a decision time and/or a decision threshold of the optical receiver are dependent on the common reference frequency of the polarization scramblers, such that a "scrambling receiver" can be implemented which takes into account the jitter caused by the polarization scrambling of the transmitted optical signal.

In a further embodiment, at least one of the polarization scramblers is connected to a reference frequency generator. In this case, the reference frequency signal is generated in one or more external frequency generators and fed to one, several or all of the polarization scramblers.

In another embodiment, the reference frequency signal is part of the optical signal and can be extracted from the optical signal. Transmission of the reference frequency signal as a part of the optical signal does allow to dispense with the use of an external reference frequency generation.

In a preferred embodiment, the optical fiber line is arranged between a wavelength multiplexer and a wavelength demultiplexer and the reference frequency signal is a modulated overtone of at least one multiplexed wavelength channel. The reference frequency may be the least common multiple of two or more of the different scrambling frequencies driving the different sections of a multi-section scrambler.

In another preferred embodiment, a scrambling frequency of a first polarization scrambler is the common reference frequency and succeeding polarization scramblers are connected to reference frequency extractors for extracting the reference frequency signal from the polarization modulation of the optical signal. The first polarization scrambler defines the reference frequency and modulates the polarization of the optical signal with the scrambling frequency corresponding to the reference frequency. The at least one reference frequency extractor extracts the reference frequency from the optical signal and makes it available to the following polarization scramblers. It is preferred that each of the succeeding polarization scramblers has a reference frequency extractor of its own.

In a further preferred embodiment, at least one reference frequency extractor comprises a polarizer followed by a photodiode, which constitutes a simple and cost-effective means for extracting the scrambling frequency from the optical signal.

In yet another preferred embodiment, scrambling frequency generators are arranged in-between the polarization scramblers and the reference frequency extractors. The scrambling frequency generators use the output of the frequency extractors as an input signal.

In another embodiment, the scrambling frequency of the polarization scramblers is smaller than a bit-rate of the optical signal.

In a preferred embodiment, at least one of the polarization scramblers comprises a plurality of polarization sections, each of which generates a polarization modulation with a scrambling frequency being a multiple of the reference frequency. Polarization is described by two parameters, so that the use of more than one scrambling frequency is necessary if covering of the whole parameter space (Poincaré-sphere) is desired.

Further advantages can be extracted from the description and the enclosed drawing. The features mentioned above and below can be used in accordance with the invention either individually or collectively in any combination. The embodiments mentioned are not to be understood as exhaustive enumeration but rather have exemplary character for the description of the invention.

DETAILED DESCRIPTION OF THE INVENTION

Figure 1:
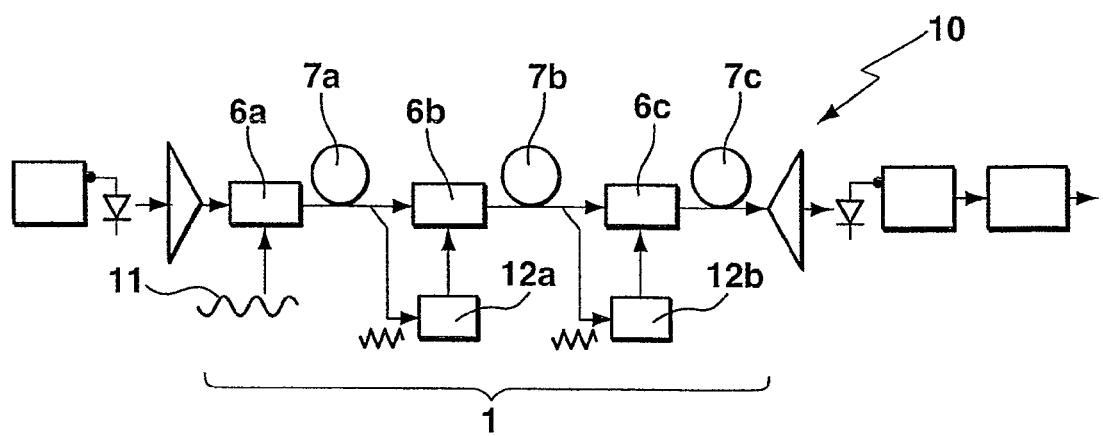
FIG. 1 shows an embodiment of a fiber optical system according to the invention.
Figure 2:
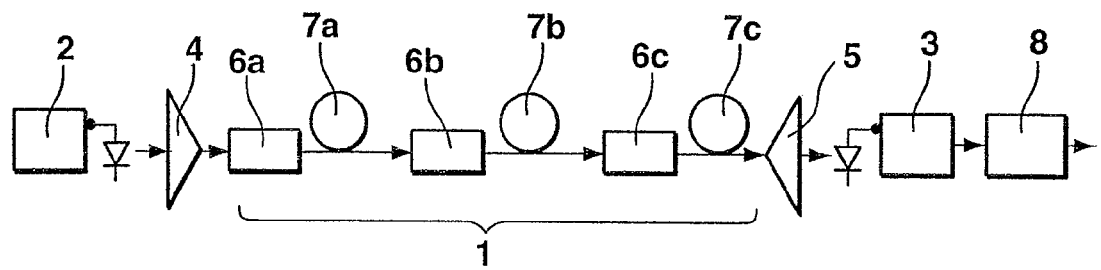
FIG. 2 shows a fiber optical system according to prior art.

In FIG. 1 a fiber optical system 10 is shown, containing all of the components of the fiber optical system shown in FIG. 2. A reference frequency signal 11 from a reference frequency generator (not shown) is externally launched into the first polarization scrambler 6a, serving as a scrambling frequency with which the polarization of the optical signal transmitted through the optical fiber line 1 is modulated.

One possible solution to communicate the scrambling frequency is to chose the external reference frequency signal 11 such that it is a modulated overtone of at least one multiplexed wavelength channel.

The following scramblers 6b and 6c are synchronized to the reference frequency signal by extracting the scrambling frequency from the optical signal. This is done by branching part of the optical signal from the optical fiber line 1 to a first and second scrambling frequency generator 12a, 12b following a first and second optical fiber link 7a, 7b. The polarization modulation of the optical signal generated by the first polarization scrambler 6a is recovered by a reference frequency extractor (not shown in FIG. 2) before each of the scrambling frequency generators 12a, 12b.

The first scrambling frequency generator 12a is driven with a scrambling frequency extracted from the reference frequency extractor and is connected to the second polarization scrambler 6b which uses its signal output as a scrambling frequency. Analogously, the third polarization scrambler 6c uses the output of the second scrambling frequency generator 12b as a scrambling frequency. Consequently, all of the three polarization scramblers 6a to 6c use the same scrambling frequency defined by the external reference frequency signal 11 launched into the first polarization scrambler 6a and transported on the transmission links 7a, 7b and 7c.

Alternatively, each of the polarization scramblers 6a to 6c may be connected to its own reference frequency generator into which an external reference frequency signal is launched. It should also be clear that it is possible to use more or less than three polarization scramblers and a corresponding number of fiber links.

Figure 3:
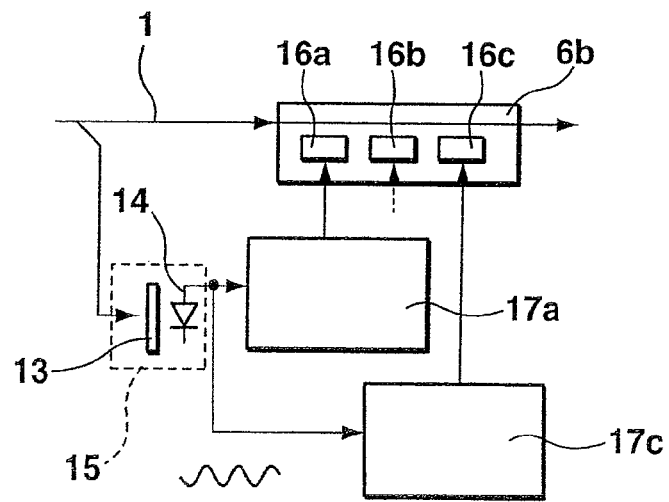
FIG. 3 shows a detail of an optical fiber line of the fiber optical system of FIG. 1 with a reference frequency extractor and a polarization scrambler with three scrambling sections.

FIG. 3 shows a detail of the optical fiber line 1 of FIG. 1 with the second polarization scrambler 6b and a reference frequency extractor 15. The first scrambler 6a (not shown in FIG. 3) serves as a master scrambler giving the scrambling rate. The second scrambler 6b consists of a polarization modulator having three modulation sections (16a to 16c). The second scrambler 6b extracts the reference frequency signal from the polarization modulation imposed by the master scrambler, as described in connection with FIG. 1. For this purpose, the reference frequency extractor 15 is used which comprises a polarizer 13 and a photodiode 14 for extracting the polarization modulation of the optical signal generated by the first polarization scrambler 6a. The output of the reference frequency extractor 15 is branched into three scrambling frequency generators 17a to 17c (two of which are shown) which define the scrambling frequencies of the polarization modulation sections 16a to 16c of the second polarization scrambler 6b. In this case, the modulation frequencies are equal to, double to, and 1.5 times of the reference frequency provided by the reference frequency extractor 15.

Depending on the specific application, each of the polarization scramblers 6a to 6c may have more than one polarization section (two, three or more) for generating polarization modulation with different scrambling frequencies. However, it is sufficient to perform polarization modulation with a single scrambling frequency, corresponding to the reference frequency, at each polarization scrambler.

In summary, the fiber optical system as described above requires only small additional effort in the distributed scramblers, shared among many multiplexed wavelength channels. PMD mitigation is more effective (or even made possible) by the synchronization, and the effort in the receivers for each separate wavelength channel is reduced (complicated adaptation can be avoided).

The invention claim is:

1. A fiber optical system for transmitting an optical signal, comprising:

an optical fiber line with a plurality of successively arranged polarization scramblers for polarization modulation of the optical signal transmitted through the optical fiber line; and means for providing a reference frequency signal which synchronizes scrambling frequencies of all of the polarization scramblers to a common reference frequency, wherein the polarization scramblers provide scrambling signals that generate a periodic polarization change with respect to the optical signal using the common reference frequency.

2. The fiber optical system according to claim 1, wherein the optical fiber line is disposed between an optical transmitter and an optical receiver, and wherein a decision threshold and/or a decision time of the optical receiver are dependent on the common reference frequency of the polarization scramblers.

3. The fiber optical system according to claim 1, wherein at least one of the polarization scramblers is connected to a reference frequency generator.

4. The fiber optical system according to claim 1, wherein the reference frequency signal is part of the optical signal.

5. The fiber optical system according to claim 1, wherein the optical fiber line is arranged between a wavelength multiplexer and a wavelength demultiplexer, wherein the multiplexer performs, at a transmitter end of the optical fiber line, wavelength division multiplexing to a plurality of optical signals with different wavelengths entering the multiplexer, and forms a wavelength multiplexed signal which is the optical signal transmitted through the optical fiber line, wherein the demultiplexer demultiplexes the optical signal at a receiver end of the optical fiber line, and wherein the reference frequency signal is a modulated overtone of at least one of the plurality of the optical signals.

6. The fiber optical system according to claim 1, wherein a scrambling frequency of a first polarization scrambler is the common reference frequency and succeeding polarization scramblers are connected to reference frequency extractors for extracting the reference frequency signal from the polarization modulation of the optical signal.

7. The fiber optical system according to claim 6, wherein at least one of the reference frequency extractors comprises a polarizer followed by a photodiode.

8. The fiber optical system according to claim 6, wherein scrambling frequency generators are arranged in-between the polarization scramblers and the reference frequency extractors.

9. The fiber optical system according to claim 1, wherein the scrambling frequency of the polarization scramblers is smaller than a bit-rate of the optical signal.

10. The fiber optical system according to claim 1, wherein at least one of the polarization scramblers comprises a plurality of polarization sections each of which generates a polarization modulation with a scrambling frequency being a multiple of the reference frequency.

11. A method of transmitting an optical signal over an optical fiber line, the method comprising:
providing a plurality of polarization scramblers along said optical fiber line; and
synchronizing said plurality of polarization scramblers to a common reference frequency using at least one scrambling frequency generator,
wherein the polarization scramblers provide scrambling signals that generate a periodic polarization change with respect to the optical signal using the common reference frequency.

12. A polarization scrambler for a fiber optical transmission system, the polarization scrambler comprising:
means for scrambling a polarization state of an optical signal with a scrambling frequency; and
means for synchronizing the scrambling frequency to a common reference frequency using a reference frequency extracted from the optical signal,
wherein the fiber optical transmission system comprises a plurality of successively arranged polarization scramblers including the polarization scrambler for respective polarization modulation of the optical signal,
wherein the reference frequency synchronizes scrambling frequencies of the plurality of polarization scramblers of the fiber optical transmission system including the polarization scrambler to the common reference frequency, and
wherein the polarization scramblers provide scrambling signals that generate a periodic polarization change with respect to the optical signal using the common reference frequency.

* * * * *